(12) United States Patent
Suh et al.

(10) Patent No.: US 10,374,772 B2
(45) Date of Patent: Aug. 6, 2019

(54) METHOD FOR SLICING K-BEST DETECTION IN MULTIPLE-INPUT MULTIPLE-OUTPUT WIRELESS COMMUNICATIONS SYSTEM

(71) Applicants: Sangwook Suh, Irvine, CA (US); John R. Barry, Atlanta, GA (US)

(72) Inventors: Sangwook Suh, Irvine, CA (US); John R. Barry, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 64 days.

(21) Appl. No.: 15/879,756

(22) Filed: Jan. 25, 2018

(65) Prior Publication Data

US 2018/0212737 A1    Jul. 26, 2018

Related U.S. Application Data

(60) Provisional application No. 62/450,124, filed on Jan. 25, 2017.

(51) Int. Cl.
*H04L 25/03* (2006.01)
*H04L 5/00* (2006.01)
(Continued)

(52) U.S. Cl.
CPC ......... *H04L 5/0053* (2013.01); *H04B 7/0473* (2013.01); *H04L 1/005* (2013.01); *H04L 1/0045* (2013.01); *H04L 5/0048* (2013.01); *H04L 25/03203* (2013.01); *H04L 25/03891* (2013.01); *H04L 5/0007* (2013.01); *H04L 5/0023* (2013.01)

(58) Field of Classification Search
CPC ......... H04B 7/02; H04L 1/005; H04L 1/0045; H04L 5/0053; H04L 25/03203; H04L 25/03216; H04L 25/03242; H04L 25/03286; H04L 25/03305; H04L 25/03891; H04L 25/061; H04L 27/38; H04L 2025/03426
USPC ........ 370/206, 252, 310, 334; 375/261, 340, 375/341
See application file for complete search history.

(56) References Cited

U.S. PATENT DOCUMENTS 6,636,568 B2   10/2003   Kadous
6,728,517 B2    4/2004   Sugar et al.
(Continued)

FOREIGN PATENT DOCUMENTS

WO    WO2015058063    *   4/2015   ....... H04L 25/03242

OTHER PUBLICATIONS

Shirly, Edward, "Modified K-Best Detection Algorithm for MIMO Systems", Mar. 2015, ARPN Journal of Engineering and Applied Sciences, vol. 10, No. 5., pp. 2284-2288.
(Continued)

*Primary Examiner* — Harun Chowdhury
(74) *Attorney, Agent, or Firm* — Bryan W. Bockhop; Bockhop Intellectual Property Law, LLC

(57) ABSTRACT

In a MIMO detector, a slicing list detection scheme employs a complex plane to represent symbols in an alphabet, in which all decision regions are bounded by either vertical lines or horizontal lines. A K-best scheme accesses the complex plane and an offline-generated lookup table to detect elements of a received vector. At each level, the system prunes all but the K-best candidates from each surviving node through the slicing list detector.

18 Claims, 6 Drawing Sheets

(51) Int. Cl.
  *H04B 7/0456* (2017.01)
  *H04L 1/00* (2006.01)

(56) References Cited

U.S. PATENT DOCUMENTS

| | | |
|---|---|---|
| 7,599,281 B1 | 10/2009 | Jones et al. |
| 7,720,169 B2 | 5/2010 | Reuven et al. |
| 2005/0271166 A1 | 12/2005 | Love et al. |
| 2008/0137765 A1* | 6/2008 | Dalla Torre .......... H04L 25/061 375/261 |
| 2011/0080979 A1* | 4/2011 | Duggan ................ H04L 1/0045 375/340 |
| 2013/0208835 A1 | 8/2013 | Balraj et al. |

OTHER PUBLICATIONS

Gowrishankar, Ramkumar, "Adaptive M-QAM Modulation for MIMO Systems," Aug. 15, 2015, IEEE Xplore.

Halpern, Daniel, "802.11 with Multiple Antennas for Dummies," believed to have been published before Jan. 25, 2018.

Akila, V., "Design of Mimo Detector using K-Best Algorithm," Aug. 2014, International Journal of Scientific and Research Publications, vol. 4, Iss. 8.

Prandoni, Paolo, "Information Theory in Modern Practice," Jan. 26, 2004.

Rahman, Mehnaz, "Hardware Architecture of Complex K-best MIMO Decoder," 2016, International Journal of Computer Science and Security (IJCSS), vol. 10, Iss. 1.

Samuel, Neev, "Deep MIMO Detection," Apr. 4, 2017, Cornell University Library.

\* cited by examiner

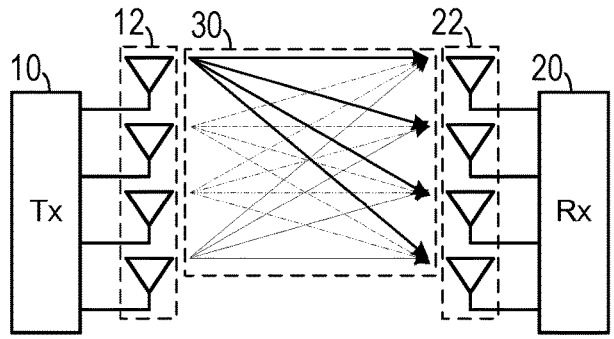
PRIOR ART
FIG. 1
FIG. 2A
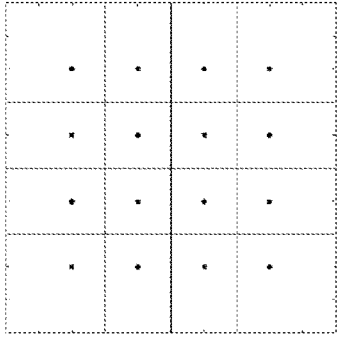
$K = 1$
(16 regions)
FIG. 2B
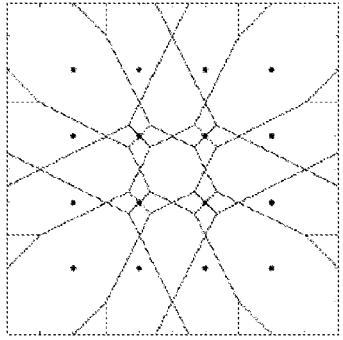
$K = 4$
(45 regions)
FIG. 2C
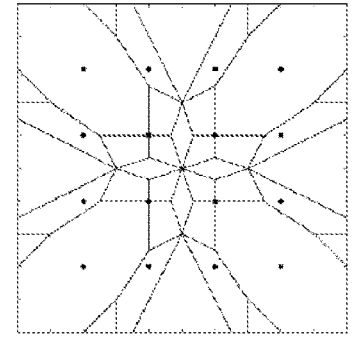
$K = 8$
(40 regions)
FIG. 2D
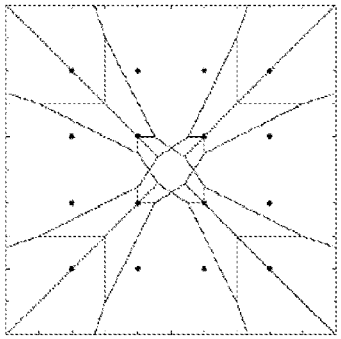
$K = 12$
(29 regions)
FIG. 2E
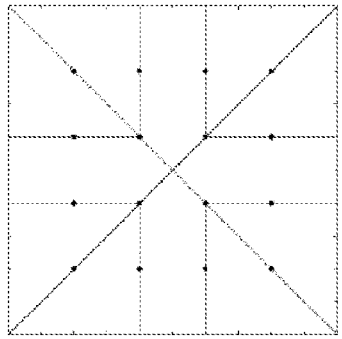
$K = 14$
(12 regions)
FIG. 2F
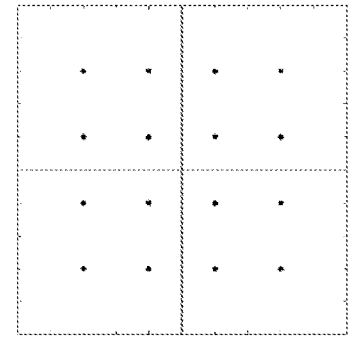
$K = 15$
(4 regions)
PRIOR ART $K = 1$ $K = 4$ $K = 8$ $K = 12$ $K = 14$ $K = 15$

4 × 4 MIMO (a) 4 × 4 MIMO

METHOD FOR SLICING K-BEST DETECTION IN MULTIPLE-INPUT MULTIPLE-OUTPUT WIRELESS COMMUNICATIONS SYSTEM

CROSS-REFERENCE TO RELATED APPLICATION(S)

This application claims the benefit of U.S. Provisional Patent Application Ser. No. 62/450,124, filed Jan. 25, 2017, the entirety of which is hereby incorporated herein by reference.

BACKGROUND OF THE INVENTION

1. Field of the Invention

The present invention relates to communication systems and, more specifically, to a system for detecting symbols in a multiple-input multiple-output wireless communications system.

2. Description of the Related Art

As shown in FIG. 1, a multiple input, multiple output (MIMO) communication system includes a transmitter 10 having an array of antennas 12 and a receiver 20 also having an array of antennas 22. A MIMO system increases data rate by transmitting multiple data streams 30 via the multiple transmit antennas. In the example shown, each antenna 12 transmits a different data stream, which results in four channels per transmit antenna 12 being generated—one between each transmit antenna 12 and each receive antenna 22, for a total of 16 different physical channels. The data streams 30 from each of the different transmit antennas 12 are perceived as a single electromagnetic signal by each of the receive antennas 22. However, because of the different physical characteristics (e.g., channel length, interference, etc.) of each of the physical channels, each receive antenna 22 perceives a different electromagnetic signal. Through signal processing the individual data streams can be recovered from the received electromagnetic signals.

Typical MIMO systems transmit streams of data elements (referred to as "symbols") over the channels. A typical MIMO system can transmit a different symbol stream from each antenna 12 simultaneously. The symbols can be as simple as single binary bits—1s and 0s, or they can be more complex symbols from an alphabet of symbols in which each symbol corresponds to a unique combination of binary bits. At any given cycle, a MIMO antenna array will transmit a symbol vector of N symbols, in which the number of elements in the vector corresponds to the number of transmit antennas 12 being employed. Each of the data streams 30 is affected by the characteristics of the physical channels, which can be represented as an $N_r$-by-N channel matrix in which N is the number of symbols in the vector (i.e., the number of transmit antennas 12) and $N_r$ is the number of receive antennas 22. Multiplying the symbol vector by the channel matrix and adding noise results in a sample vector, in which each element corresponds to what is received by each of the receive antennas 22.

Analysis of the sample vector results in detection of the original symbol vector, which can then be used to reconstruct the original data that was transmitted. However, as more antennas are employed in MIMO systems, detection of symbol vectors becomes an increasingly complex problem (NP hard or NP complete). Given that symbol detection has to be done in real time in almost all systems, such complex detection is impractical for all but the simplest of systems. As a result, many systems employ detection schemes that accept the probability of limited errors in the detection as a trade-off for more simple (and quick) symbol detection. (If such errors occur at a sufficiently low rate, they can be corrected using error detection and correction.)

A MIMO communication system employs multiple (N) transmit antennas and multiple ($N_R$) receive antennas for data transmission. A MIMO channel formed by the $N_T$ transmit and $N_R$ receive antennas may be decomposed into $N_S$ independent channels. Each of the $N_S$ independent channels may also be referred to as a spatial subchannel (or a transmission channel) of the MIMO channel and corresponds to a dimension. A different data stream may be transmitted on each of the independent channels. The transmitted data streams experience different channel conditions (e.g., different fading and multipath effects) and achieve different signal-to-noise-and-interference ratios (SNRs) for a given amount of transmit power.

The push for higher spectral efficiency in MIMO communications systems and standards is leading to an increase in both the number of antennas and the alphabet size. The IEEE 802.11ac wireless LAN standard supports up to N=8 spatial streams through a MIMO channel using M-ary QAM with alphabet size as large as M=256. Also, the next-generation (5G) cellular network will use carrier frequencies above 6 GHz, enabling an increase in the number of antennas with half-wavelength spacing in a small form factor. The increased spectral efficiency comes at the price of increased complexity of the MIMO detector at the receiver, which grows rapidly with N and M. For example, an exhaustive search maximum-likelihood (ML) detector that considers all $M^N$ possible combinations of transmitted symbols quickly becomes prohibitive for large N and M A variety of suboptimal MIMO detectors with reduced complexity have been proposed for MIMO systems. For example, the zero-forcing (ZF) and minimum mean-squared-error (MMSE) linear detectors have low complexity but limited performance. Ordered successive interference cancellation (OSIC) detectors, also known as vertical Bell Laboratories layered space-time (V-BLAST) detectors perform better than linear detectors, but still fall significantly short of ML performance. The parallel detector (PD) considers all possible candidates for the first symbol, then separately implements an OSIC detector based on each candidate for the first symbol to recover the remaining symbols. Accordingly, the PD scheme provides better performance than the OSIC scheme at the cost of increased complexity. Lattice-reduction aided detectors use the Lenstra-Lenstra-Lovasz algorithm or Seysen's algorithm as a preprocessing step to transform the channel matrix into a more orthogonal channel, but the high complexity of lattice reduction is a burden for fast fading channels. A semidefinite relaxation based scheme rephrases MIMO detection as a convex optimization problem, but the complexity is still high when M is large.

Many MIMO detectors are cast as a search through an M-ary tree with N layers. For example, the sphere decoder is a depth-first tree search strategy based on Fincke-Pohst or Schnorr-Euchner enumeration that can approach the performance of the ML detector, but with high complexity that varies depending on the channel and noise.

The K-best detector is an effective strategy for searching a tree, not only because it provides a flexible performance-complexity tradeoff, but also because it has a fixed complexity that is independent of the channel and noise, which makes it amenable to physical implementation. However, as the alphabet size M increases, the complexity of the K-best scheme rapidly increases, due to the fact that the number of candidates in each layer is scaled up by a factor M.

The processing delay of the K-best scheme can be reduced by exploiting parallel computations at the cost of larger number of functional units, and also by simplifying the Euclidean-norm metric computations, but nether reduces the size of the search space.

Selective spanning with fast enumeration (SSFE) is a method aimed at reducing the search space of the K-best scheme. With selective spanning, the value of K decreases as the scheme progresses through the layers of the tree. Fast enumeration is realized by first quantizing the complex input to the closest alphabet symbol, then obtaining the set of K−1 neighboring symbols from the quantized symbol. For a 4×4 MIMO system using 64-QAM, with the help of channel coding, the coded BER performance of SSFE with K=[4, 2, 1, 1] in each layer is similar to that of the K-best scheme with K=4, and that SSFE with K=[8, 4, 2, 1] is similar to K-best with K=8. However, the performance of detector itself is degraded due to having less number of candidates in the later layers. Also, using a small value of K at the final layer can lead to unreliable log-likelihood ratio (LLR) estimates for soft-output detection.

The following section presents the channel model and a description of the tree structure, along with a summary of the conventional K-best MIMO detector.

Channel Model and the K-Best Mimo Detector

Channel Model and the Detection Tree

Consider a linear memoryless MIMO channel with N transmit antennas and $N_r$ ($\geq N$) receive antennas, whose complex baseband model is given by:

$$y = Hx + z, \quad (1)$$

where $y=[y_1, \ldots, y_{N_r}]^T$ is the received vector, $x=[x_1, \ldots, x_N]^T$ is the transmitted vector whose elements are independently chosen from the same QAM alphabet $x_i \in \mathscr{A}$ of size $|\mathscr{A}|=M$, H is the $N_r \times N$ channel matrix with rank N, and $z=[z_1, \ldots, z_{N_r}]^T$ is the noise vector. It is assumed throughout this disclosure a QAM alphabet whose size M is an even power of 2, with real and imaginary parts consisting of the odd integers from $-\sqrt{M}+1$ to $\sqrt{M}-1$, so that the energy of the alphabet is $$\mathscr{E} = \frac{2(M-1)}{3}.$$

Also, this disclosure assumes a Rayleigh fading channel, so that the entries of H are i.i.d. zero-mean complex Gaussian random variables with unit variance, and this disclosure assumes additive white Gaussian noise (AWGN), in which the entries of z are i.i.d. zero-mean complex Gaussian random variables with variance $\sigma^2$. The signal-to-noise ratio (SNR) at the receiver is then given by $$\frac{N\mathscr{E}}{\sigma^2}.$$

The ML detector chooses its decision $x \in A^N$ to minimize $$J_N(x) = \|y - Hx\|^2 \quad (2)$$

$$= \|\hat{y} - Rx\|^2 = \sum_{l=1}^{N} |\hat{y}_l - \sum_{j=1}^{l} R_{lj}x_j|^2, \quad (3)$$

where it has been introduced $\hat{y}=Q^H y$, where Q is the unitary matrix in the QR decomposition H=QR of the channel matrix, and where R is a lower-triangular matrix with positive real diagonal elements. R is chosen to be lower triangular for the sake of simpler presentation, since an upper-triangular choice would require that the entries of $\hat{y}$ and x be processed in a reverse order.

Equation (3) can be interpreted as the sum of N branch metrics in a path through an M-ary tree with N layers, whose $M^N$ leaf nodes represent all possibilities for $x \in \mathscr{A}^N$. The $\mathscr{l}$-th layer of the tree has $M^{\mathscr{l}}$ nodes, one for each possible combination of $\{x_1, \ldots, x_{\mathscr{l}}\}$. To the branch from a node at the ($\mathscr{l}$−1)-th layer to a child at the $\mathscr{l}$-th layer a metric is assigned according to (3), which can be rewritten as: $BM_l = |\tilde{y}_l - R_{ll}x_l|^2$ (4)

where $$\tilde{y}_l = \hat{y}_l - \sum_{j=1}^{l-1} R_{lj}x_j$$

represents the observation for the $\mathscr{l}$-th layer after the contributions from the previous layer symbols $\{x_1, \ldots, x_{l-1}\}$ have been subtracted.

The K-Best MIMO Detector

The K-best algorithm, also known as the QRD-M algorithm, is a breadth-first strategy for searching the tree. It proceeds through the tree one layer at a time, starting at the root, and at each layer it only hands over the surviving K nodes with the smallest cost to the next layer.

Pseudocode for the K-best detector is given in Algorithm 1. Here an ordered vector $c=[x1, \ldots x_{\mathscr{l}}] \in \mathscr{A}^{\mathscr{l}}$ is used to represent a candidate node at the $\mathscr{l}$-th layer of the tree, with the null set $\varphi$ representing the root node at layer zero, and the set of all transmit vectors $\mathscr{A}^N$ representing the $M^N$ leaf nodes at layer N. The cost of a candidate node c at the $\mathscr{l}$-th layer is denoted $J_{\mathscr{l}}(c)$. The set of all candidates (before pruning) at a given layer is denoted by $\mathscr{C}$, while the set of all survivor nodes (after pruning) is denoted by S.

| Algorithm 1 The K-Best MIMO Detector |
|---|
| 1:  $S = \varphi$ |
| 2:  $J_0(\varphi) = 0$ |
| 3:  for l = 1 to N do |
| 4:    $\mathscr{C} = \varphi$ |
| 5:    for $s \in S$ do |
| 6:      $\tilde{y}_l = \hat{y}_l - \Sigma_{j-1}^{l-1} R_{lj}s_j$ |
| 7:      for $x_l \in A$ do |
| 8:        c = [ s \| $x_l$ ] |
| 9:        $J_l(c) = J_{l-1}(s) + |\tilde{y}_l - R_{ll}x_l|^2$ |
| 10:       $\mathscr{C} \leftarrow \mathscr{C} \cup_c$ |
| 11:     end for |
| 12:   end for |
| 13:   if l < N then |
| 14:     $S = \text{prune}(\mathscr{C})$, keeping only the K best |
| 15:   else |
| 16:     $\hat{x} = \text{Best}(S)$ |
| 17:   end if |
| 18: end for |

Lines 1 and 2 of this pseudocode initialize the survivor as the root node with zero cost. The algorithm then steps through the N layers of the tree, where for each layer it forms a set $\mathscr{C}$ of candidate nodes comprising the M children of each of the survivor nodes from the previous layer, and further computes their associated costs. At the first layer of the tree there are $|\mathscr{C}|$=M candidates, while at all remaining layers there are $|\mathscr{C}|$=KM. The K best candidates from $\mathscr{C}$ are declared to be the survivors in line 14. After reaching the last layer of the tree, the leaf node with the smallest metric is declared to be the detected symbol set in line 16.

In lines 7-11, the algorithm adds all M children of each surviving node to the candidate set $\mathscr{C}$. In fact, however, there is no need to extend all M children of a node, since at most K children from each node will ever survive the pruning process to the next layer. This suggests a prune-as-you-go modification of the K-best detector, in which the M branches from each survivor node are immediately pruned to the K best branches, without consideration of any other survivor nodes. This modification reduces the number of branches from each survivor node to K, and thus reduces the total number of metrics to be computed and sorted in each layer from KM to $K^2$. While it might seem that this reduction in complexity is partially offset by the additional complexity introduced by the intermediate pruning steps, these pruning steps can be accomplished with negligible complexity using the slicing list detector of the present invention.

Scalar List Detection

The prune-as-you-go approach in the previous section leads to an alternative implementation of the K-best detector built upon a scalar list detector. In particular, the combination of (i) extending a survivor node to its M children, and (ii) pruning to the K best, can be viewed as a single instance of a scalar list detector. Specifically, the invention employs a list detector of length K for an M-ary alphabet $\mathscr{A}$ as a mapping from $\mathbb{C}$ to a subset $\mathscr{L} \subset \mathscr{A}$ of size $|\mathscr{L}|$=K. The list detector is thus like a conventional hard-output detector, except that it produces a list of multiple alphabet symbols as its decision instead of just one. The remainder of this section examines the design and performance of the scalar list detector.

The Minimum-Distance List Detector

Given a complex input p, the minimum-distance list detector produces the list of K elements of the alphabet that are closest top, based on the squared Euclidean distances $\{|p-x|^2 : x \in \mathscr{A}\}$. As an example of minimum-distance list detection, consider the case of M=16 QAM. As shown in FIGS. 2A-2F, the decision regions of the minimum-distance list detector for six different values of K. In each case, the complex plane is partitioned into a finite number of disjoint decision regions, so-named because every point in a given decision region get mapped to the same decision list. With the decision regions and decision lists defined, the problem of mapping a given point p to its minimum-distance list can be transformed to determining in which of the decision regions the given point p is located. However, the irregular shapes of the decision regions make the task of identifying the correct decision region to be computationally intensive, with no obvious alternative to a brute-force approach for each point p of first computing then sorting the M metrics $\{|p-x|^2 : x \in \mathscr{A}\}$.

As an example of minimum-distance list detection, consider the case of M=16 QAM, FIGS. 2A-2F, show the decision regions of the minimum-distance list detector for six different values of K. In each case, the complex plane is partitioned into a finite number of disjoint decision regions, so-named because every point in a given decision region get mapped to the same decision list. With the decision regions and decision lists defined, the problem of mapping a given point p to its minimum-distance list can be transformed to determining in which of the decision regions the given point p is located. However, the irregular shapes of the decision regions make the task of identifying the correct decision region to be computationally intensive, with no obvious alternative to a brute-force approach for each point p of first computing then sorting the M metrics $\{|p-x|^2 : x \in \mathscr{A}\}$.

To reduce the processing delay and enhance the power efficiency of wireless communication receivers, there is a need for a MIMO detection system that detects transmitted symbols with low complexity and with a sufficiently low error rate.

SUMMARY OF THE INVENTION

The disadvantages of the prior art are overcome by the present invention which, in one aspect, is a method of detecting a MIMO signal transmitted from N antennas, in which the MIMO signal represents a transmitted vector of N elements, each of the N elements being transmitted by a different one of the N antennas and each of the N elements including a selected symbol from an alphabet of M symbols. The MIMO signal is represented as a received vector of $N_R$ elements, in which each of the $N_R$ elements corresponds to a different receiver antenna of an array of receiver antennas. In the method a complex plane with a real axis and an imaginary axis encompasses a complex representation of every symbol in the alphabet. A finite number of decision regions is defined within the complex plane, each decision region is defined to encompass a different combination of K symbols in the alphabet, in which each decision region is bounded by threshold lines consisting of horizontal threshold lines that are parallel to the real axis and vertical threshold lines that are parallel to the imaginary axis, so as to accomodate the slicing operation inside the slicing list detector, and in which K is a selected number taken from a set of integers. Here, the slicing operation in the slicing list detector replaces 1) computing metrics, 2) sorting metrics, and 3) selecting candidates with the smallest metrics. The received vector is modified to be represented as a complex point p having a real component and an imaginary component. A reconstructed transmitted vector is nulled and then the following loop is executed: mapping the complex point p onto a complex plane; then comparing the real component of the complex point p to the vertical threshold lines and imaginary component of the complex point p to the horizontal threshold lines, to determine which decision region encompasses the complex point p; then accessing a lookup table, which can be obtained in advance from Eq. (5), to determine which K symbols associated with the decision region that encompasses the complex point p are closest to the complex point p, and adding the closest K symbols to the candidate set of detected symbol vector; and then when N detected symbols have been detected in the reconstructed transmitted vector, exiting the loop. After the loop has been exited, the reconstructed transmitted vector is returned.

In another aspect, the invention is a method for detecting a MIMO signal transmitted from N antennas, in which the MIMO signal represents a transmitted vector of N elements, each of the N elements being transmitted by a different one of the N antennas and each of the N elements from an alphabet of M symbols. The MIMO signal is represented as a received vector of $N_R$ elements, in which each of the $N_R$ elements corresponds to a different receiver antenna of an array of receiver antennas. In the method a complex plane with a real axis and an imaginary axis encompasses a complex representation of every symbol in the alphabet. A finite number of decision regions are defined within the complex plane. Each decision region is defined to encompass a different combination of K symbols in the alphabet. Each decision region is bounded by threshold lines consisting of horizontal threshold lines that are parallel to the real axis and vertical threshold lines that are parallel to the imaginary axis. K is a selected number taken from a set of integers. The horizontal threshold lines are chosen so that each of the horizontal threshold lines intersects the imaginary axis at integers ranging from $-\sqrt{M}$ to $\sqrt{M}$ and the vertical threshold lines are chosen so that each of the vertical threshold lines intersects the real axis at integers ranging from $-\sqrt{M}$ to $\sqrt{M}$. Each symbol includes a real component and an imaginary component in which the real components and imaginary components consist of odd integers from $-\sqrt{M}+1$ to $\sqrt{M}-1$. The step of defining a finite number of decision regions includes the step of dividing the complex plane into a total of $4(\sqrt{M}+1)^2$ sub-regions, in which 4M of the sub-regions are defined to be square in shape are grouped together in a center portion of the complex plane, while $4(1+2\sqrt{M})$ of the sub-regions are placed at edges and the corners of the center portion and are of a semi-infinite rectangular in shape and selecting boundaries for each selected decision region so that each of the K symbols associated with the selected decision region is one of K best selections for a complex point p mapped into the selected decision region. The received vector is modified to be represented as a complex point p having a real component and an imaginary component. A reconstructed transmitted vector is nulled and then the following loop of steps is executed: mapping the complex point p onto complex plane; then comparing the real component of the complex point p to the vertical threshold lines and imaginary component of complex point p to the horizontal threshold lines to determine which decision region encompasses the complex point p; then accessing a lookup table, in which the lookup table haves been compiled offline, to determine which K symbols associated with the decision region that encompasses the complex point p are closest to the complex point p and adding the closest K symbols to the candidate set of detected symbol vector; and then when N detected symbols have been detected in the reconstructed transmitted vector, exiting the loop. After the loop has been exited, the reconstructed transmitted vector is returned.

In yet another aspect, the invention is a receiver for receiving a MIMO signal transmitted from N antennas, the MIMO signal representing a transmitted vector of N elements, each of the N elements being transmitted by a different one of the N antennas and each of the N elements including a selected symbol from an alphabet of M symbols, the MIMO signal represented as a received vector of $N_R$ elements, in which each of the $N_R$ elements corresponds to a different receiver antenna of an array of receiver antennas. The receiver includes an array of $N_R$ antennas, memory on which is stored a lookup table that has been compiled offline and that relates values of the received vector to symbols from the alphabet, and a signal processing circuit. The signal processing circuit is responsive to the antennas and in data communication with the memory and is programmed to execute steps, including: define a finite number of decision regions within a complex plane, each decision region defined to encompass a different combination of K symbols in the alphabet, in which each decision region is bounded by threshold lines, consisting of horizontal threshold lines that are parallel to the real axis and vertical threshold lines that are parallel to the imaginary axis, and in which K is a selected number taken from a set of integers; modify the received vector to be represented as a complex point p having a real component and an imaginary component; null a reconstructed transmitted vector and then execute a loop of steps including: (1) map the complex point p onto the complex plane; (2) then compare the real component of the complex point p to the vertical threshold lines and imaginary component of complex point p to the horizontal threshold lines to determine which decision region encompasses the complex point p; (3) then access the lookup table to determine which K symbols associated with the decision region that encompasses the complex point p are closest to the complex decision point and adding the closest K symbols to the candidate set of detected symbol vector; and (4) then when N detected symbols have been detected in the reconstructed transmitted vector, exit the loop. After the loop has been exited, the reconstructed transmitted vector is return.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1 is a schematic diagram of one example of a prior art MIMO communications system.

FIGS. 2A-2F are graphical representations of a complex plane used in a prior art minimum-distance list detector.

DETAILED DESCRIPTION OF THE INVENTION

Figure 3:
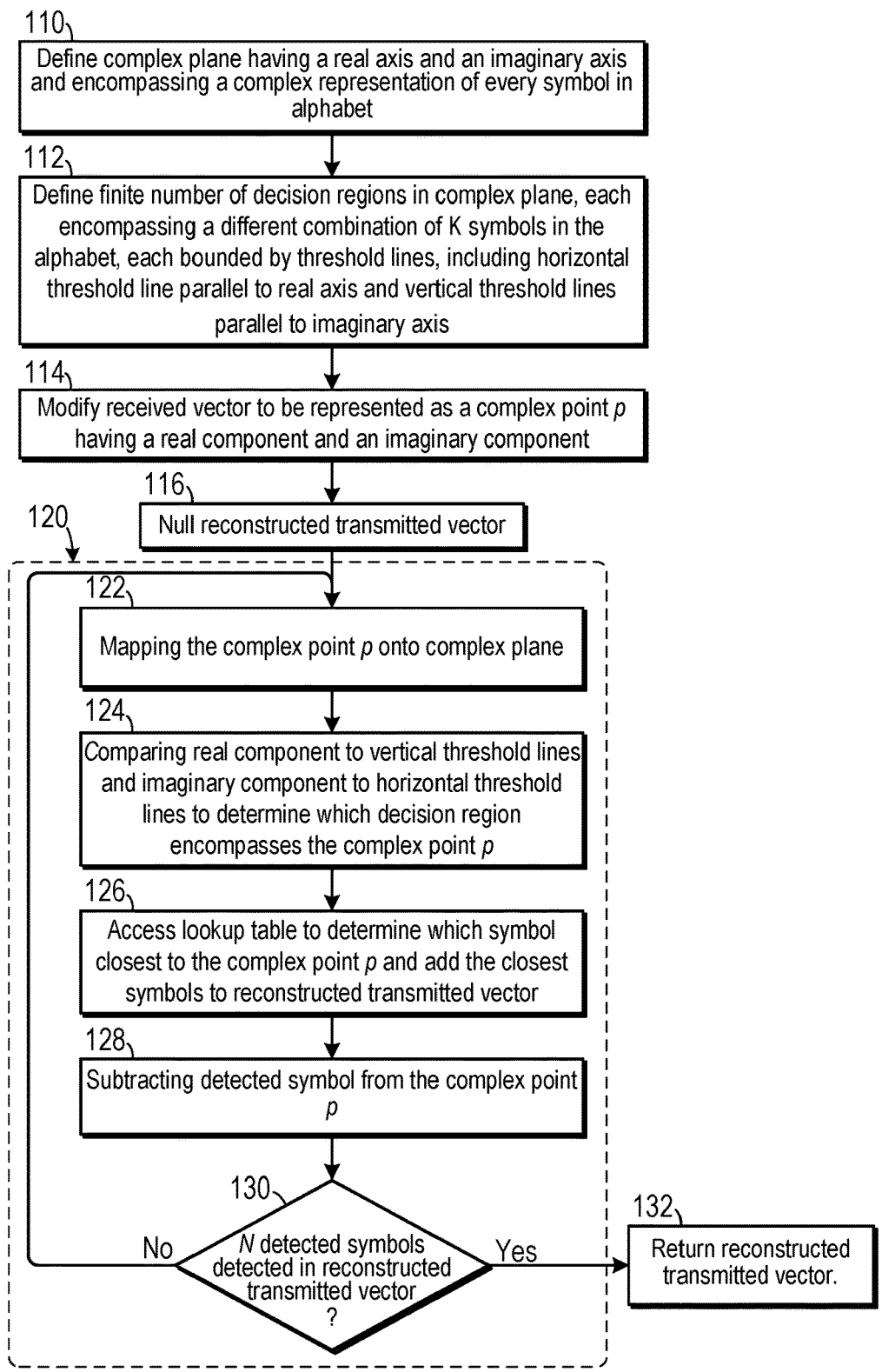
FIG. 3 is a flow chart demonstrating one represented embodiment of a method for detecting values from a MIMO signal.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. Pat. No. 6,636,568, issued to Kaous, discloses a MIMO system and is incorporated herein by reference for the purpose of disclosing such systems. U.S. Pat. No. 7,720,169, issued to Reuven et al., discloses multiple-input multiple-output (MIMO) detectors and a MIMO detector employing a K-best detection scheme, and is incorporated by reference herein for the purpose of disclosing such schemes.

As shown in FIG. 3, one embodiment of a MIMO detector performs the following operations: Define a finite number of decision regions in a complex plane, each encompassing a different combination of K symbols from the alphabet, each bounded by threshold lines, including horizontal threshold lines parallel to real axis and vertical threshold lines parallel to imaginary axis 112; Modify received vector to be represented as a complex point p having a real component and an imaginary component 114; Null reconstructed transmitted vector 116 and then execute loop 120. In loop 120 the following steps are executed: Mapping the complex point p onto complex plane 122; Comparing real component to vertical threshold lines and imaginary component to horizontal threshold lines to determine which decision region encompasses the complex point p 124; Access lookup table to determine which K symbols are closest to the complex point p and add the closest K symbols to reconstructed transmitted vector 126; Subtracting detected symbol from the complex decision point 128; and Determining if N detected symbols have been detected in the reconstructed transmitted vector 130. Once loop 120 has been exited, the reconstructed transmitted vector is returned 132 for further processing.

One representative embodiment of the invention includes a modification of the K-best detector for the case of QAM alphabets that significantly reduces complexity when K<M, without compromising performance. The present detector is based on a scalar list detector for M-ary QAM that uses a slicing operation to approximate the minimum-distance list detector, a modification that provides two benefits: it reduces the number of metric computations for each node from M to K, and it reduces the number of candidates to be sorted at each layer from KM to $K^2$. Simulation results show that the present slicing K-best scheme provides almost identical performance to that of the conventional K-best scheme, but with significantly reduced complexity. Since the slicing list detection is performed at each node in every layer of the detection process, the complexity reduction is especially significant for a MIMO system with a large number of antennas N and with a large alphabet size M.

The Slicing List Detector

One embodiment is a suboptimal list detector with significantly reduced complexity called the slicing list detector. Like the minimum-distance list detector, the slicing list detector has a finite number of decision regions, and every point in a given region gets mapped to the same decision list. Unlike the minimum-distance detector, however, the invention imposes the constraint that the thresholds that divide adjacent decision regions be either horizontal or vertical lines. This simple constraint enables us to determine in which decision region a given complex point lies by a simple operation commonly known as slicing: by separately comparing the real and imaginary parts of the given point with a set of fixed threshold values. By constructing a lookup table that maps each decision region to the corresponding decision list, the slicing list detector can be implemented with extremely low complexity.

There are two primary degrees of freedom in the design of a slicing list detector: (i) choosing the slicing thresholds which defines the decision regions, and (ii) choosing the decision list that corresponds to each decision region. These two choices are examined in the following two subsections.

1) Slicing Thresholds: Given that the real and imaginary parts of the M-QAM symbols consist of the odd integers from $-\sqrt{M}+1$ to $\sqrt{M}-1$, the threshold values for both the real and imaginary parts can be placed at all integers from $-\sqrt{M}+$ to $\sqrt{M}$. This choice leads to dividing the complex plane into a total of 4 $(\sqrt{M}+1)^2$ sub-regions, 4M of which in the middle are square in shape, while $4(1+2\sqrt{M})$ at the edges and the corners are semi-infinite rectangular in shape.

2) Decision Lists: Once the thresholds are defined, it remains to identify the decision list of K alphabet symbols with each corresponding decision region. The list $\mathcal{L}_i$ associated with the i-th sub-region $\mathcal{R}_i$ can be chosen so as to minimize the following mean-squared-error (MSE) metric of the difference in Euclidean distances:

$$\mathcal{L}_i = \arg\min_{\mathcal{L}} E\left[\frac{1}{K}\sum_{k=1}^{K}\{\hat{d}_k(p) - d_k(p)\}^2 \,\Big|\, p \in \mathcal{R}_i\right], \quad (5)$$

$$i = 1, \cdots, 4(\sqrt{M}+1)^2,$$

where $\hat{d}_1(p) \le \hat{d}_1(p) \le \ldots \le \hat{d}_K(p)$ are the sorted distances from the point $p \in \mathbb{C}$ to each of the K symbols in the list $\mathcal{L}$, and $d_1(p) \le d_2(p) \le \ldots \le d_K(p)$ are the sorted distances from the point p to each of the closest K symbols in the minimum-distance list. Here, the point p is a complex random variable that is defined by p=x+n, where $x \in \mathcal{A}$ is a uniformly distributed complex symbol, and n is zero-mean circularly-symmetric complex Gaussian noise. Strictly speaking, the decision lists found through (5) are a function of SNR. Nevertheless, in practice the invention has achieved good performance by obtaining a single list at a single nominal SNR value, then using that list for all encountered SNR values. This is possible because when a change in SNR causes the decision list for a complex point p to change, the change is at the end of the list (corresponding to the symbol furthest from p), where one distant symbol with a low probability of being transmitted is replaced by another distant symbol with a similarly low probability of being transmitted.

Figure 4A:
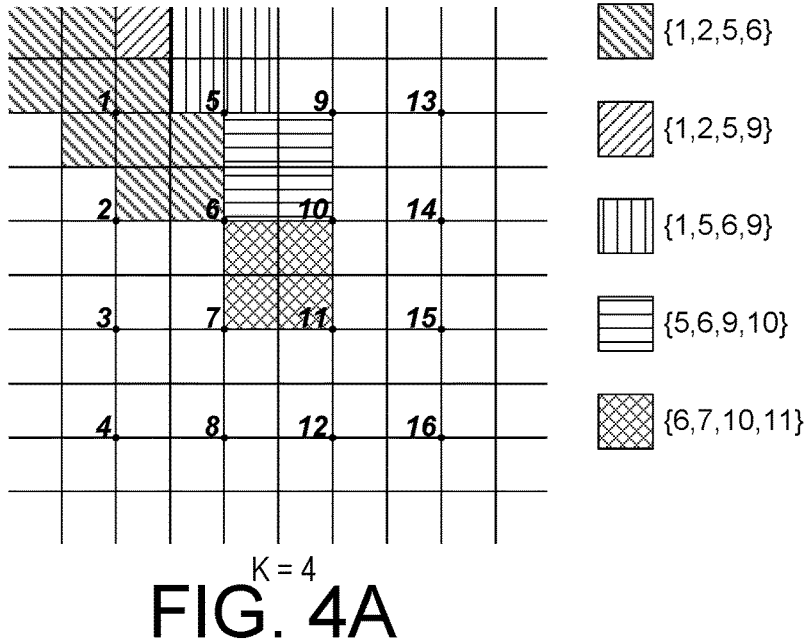
FIGS. 4A-4B are graphical representations of a complex plane employed in one representative embodiment of the invention, in which the complex plane is divided into slicing decision regions with corresponding decision lists.
Figure 4B:
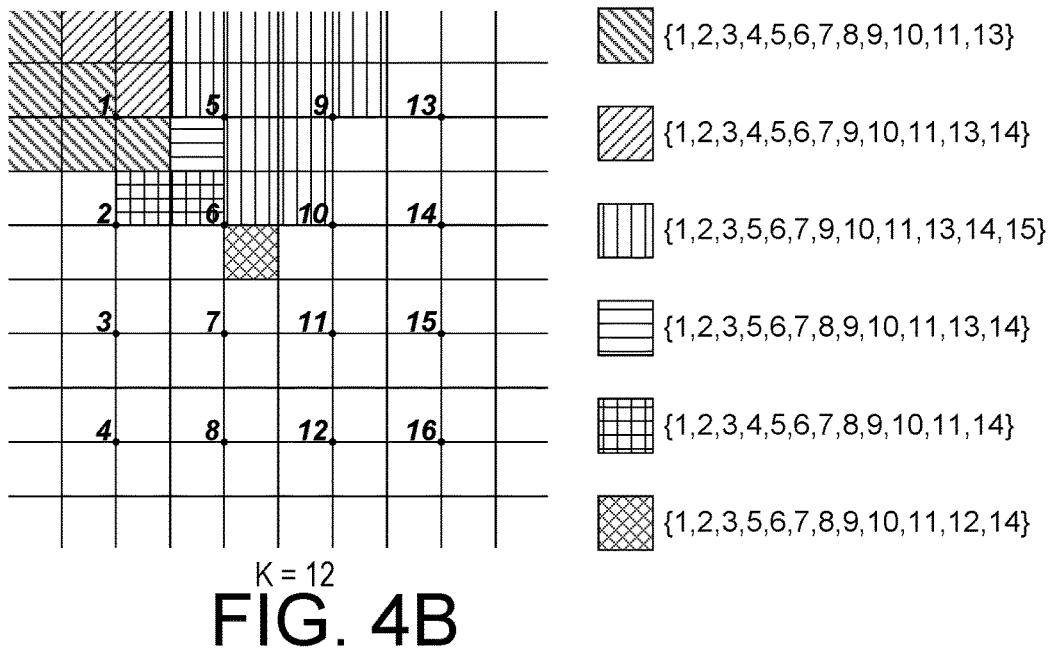
Figure 5A:
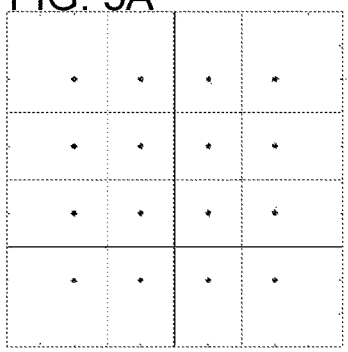
FIG. 5A-5F are graphical representations of a complex plane employed in one representative embodiment of the invention, in which the complex plane is divided into slicing decision regions.
Figure 5B:
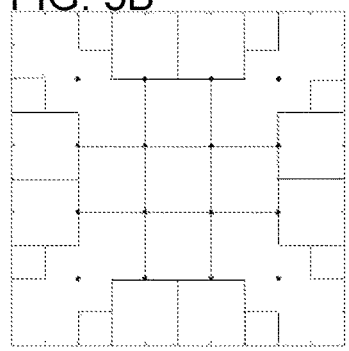
Figure 5C:
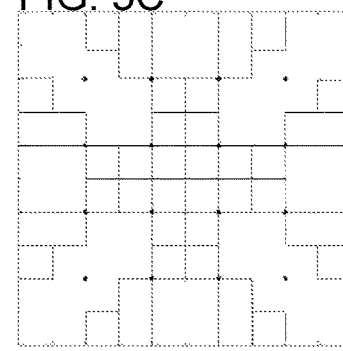
Figure 5D:
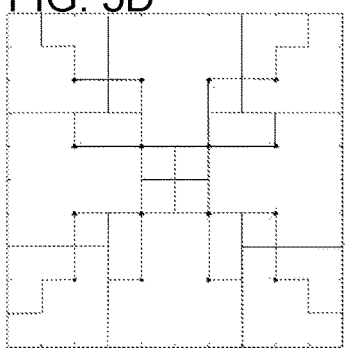
Figure 5E:
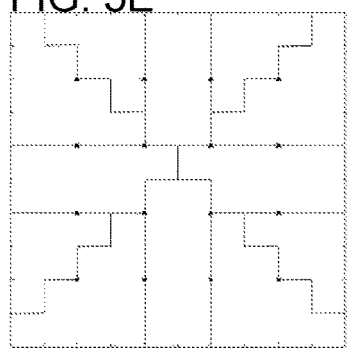
Figure 5F:
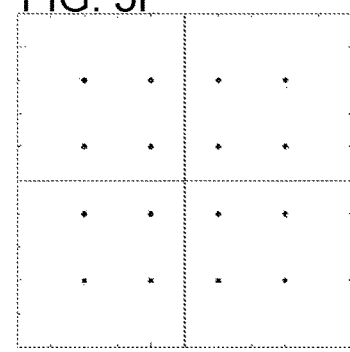

The decision lists of the slicing list detector for 16-QAM with K=4 and K=12 are illustrated in FIGS. 4A-4B, where the thresholds are shown as solid black lines. In the figures, the decision lists associated with the decision regions are obtained by the criterion given in (5) at SNR=0 dB. The decision lists for the remaining decision regions follow from symmetry considerations.

The decision regions of the slicing list detector for 16-QAM with different values of K (assuming SNR=0 dB) are shown in FIGS. 5A-5F. Comparing these figures to the corresponding prior art figures shown in FIGS. 2A-2F, it can be sees how the slicing list detector approximates the decision regions of the minimum-distance list detector, subject to its constraint that the boundaries be horizontal and vertical lines.

The performance of a scalar list detector is quantified by its list error probability (LEP), which is defined as the probability that the transmitted symbol is not included in the decision list. In a comparison between an LEP of the slicing list detector and the minimum-distance list detector in a Rayleigh fading channel for the case of 16-QAM, the LEP of the slicing list detector closely matches that of the minimum-distance list detector. It should be noted that the list error probability closely matches with that of the minimum-distance list detector in a Rayleigh fading channel for 16-QAM with K ∈ {4, 8, 12, 14}.

Also, in the performance of an alternative design strategy for a list detector, the set of K candidates are determined by first quantizing the point p to the closest symbol, then obtaining the list of neighboring K−1 symbols from the closest symbol. Since the distance between adjacent thresholds is fixed to the minimum distance between symbols, it suffers from performance degradation. Furthermore, the discrete Gaussian distribution of the point p is not accounted for in mapping the decision lists. Accordingly, FIG. 4 shows that the closest-symbol list detector suffers an SNR loss of between 0.5 dB and 1.8 dB, depending on the value of K.

The Slicing K-Best MIMO Detector

The prune-as-you-go strategy discussed above can be built on the concept of scalar list detection, since the process of determining the K best of the M children from a given survivor node is equivalent to applying the interference-reduced channel observation for the node to the minimum-distance list detector. This leads to the slicing K -best detector, presented in the pseudocode of Algorithm 2. Unlike Algorithm 1, which extends each survivor to all M children, Algorithm 2 uses a list detector to extend each survivor to only K of its children. If the minimum-distance list detector in line 7, then Algorithm 2 is used, it would produce exactly the same decisions as Algorithm 1. Instead, the present detector employs the slicing list detector, such that Slicing-List( ) in line 7 maps its input argument $\tilde{y}_l/R_{ll} \in \mathbb{C}$ to the decision list $\mathcal{L} \subset A$ determined above, where $\mathcal{L} = K$. At the first layer of the tree there are $|\mathcal{E}|=K$ candidates, while at all remaining layers there are $|\mathcal{E}|=K^2$ candidates. The previous path metric $J_{\ell-1}(s)$ in line 10 remains constant for all children from the same node, so adding the term does not alter the choice of K best children from each node. The K best survivors from $K^2$ candidates are determined in line 15 while taking into account K different values of the previous path metrics, so the ordering within the K children from each node is not required. Thus, a simple slicing operation that yields an unsorted list of K best children from each node suffices in line 7.

---

Algorithm 2 The Proposed Slicing K-Best MIMO Detector

1: $\mathcal{S} = \phi$
2: $J_0(\phi) = 0$
3: for l = 1 to N do
4:    $\mathcal{E} = \phi$
5:    for s ∈ $\mathcal{S}$ do
6:       $\tilde{y}_l = \tilde{y}_l - \Sigma_{j=1}^{l-1} R_{lj}s_j$
7:       L = SlicingList($y_l/R_{ll}$)
8:       for $x_l$ ∈ L do
9:          c = [ s | $x_l$ ]
10:         $J_l(c) = J_{l-1}(s) + |\tilde{y}_l - R_{ll}x_l|^2$
11:         $\mathcal{E} \leftarrow \mathcal{E} \cup_c$
12:       end for
13:    end for
14:    if l < N then
15:       $\mathcal{S}$ = prune($\mathcal{E}$), keeping only the K best
16:    else
17:       $\hat{x}$ = Best($\mathcal{S}$)
18:    end if
19: end for

---

There are two immediate benefits from the fact that the slicing list detector in Algorithm 2 extends a survivor node only to K of its children, as opposed to all M children in Algorithm 1: (1) The number of metrics computations in each layer is reduced by K/M; and (2) The number of metrics to be sorted to prune to K survivors in each layer is reduced by K/M.

It is known that sorting techniques have an average complexity of O(nlogn) or larger, where n is the length of a sorting list. So, by reducing the size of a sorting list from KM to $K^2$, the sorting complexity is reduced by a factor of less than K/M. It is also noteworthy that there is no sorting and selection process required at the first layer in the present slicing K-best detector, since the K survivors from the first layer are solely determined by a simple slicing operation, and the ordering within the K survivors is again not required. The overall effect is a net reduction in complexity by a factor of less than K/M.

In a practical implementation of one embodiment of the invention, the computation required for obtaining the lookup table for slicing list detector can be simplified by making the complex random variable p to be uniformly distributed, rather than Gaussian distributed.

The following is an example of a Matlab script for generating the slicing list:

---

```
function Kbest_list(M,K)
    abc = qammod(0:M−1,M);
    x_start = min(real(abc))−2−0.5;
    x_end = max(real(abc))+2−0.5;
    x = x_start:1:x_end;
    length_x = length(x);
    ix_mod = zeros(K,length_x/\2);
    for ii=1:length_x
        for jj=1:length_x
            z = x(ii) + j*x(jj);
            dist = abs(z−abc);
            [dist_sort,ix] = sort(dist);
            ix_mod(:,(ii−1)*length_x+jj) = qammod(ix(1:K)−1,M).';
        end
    end
    for r=1:length_x
        Kbest_list_temp(:,1:length_x,r) =
            ix_mod(:,length_x*(r−1)+1:length_x*r);
    end
    Kbest_list = Kbest_list_temp(:,2:length_x,2:length_x);
    filename = sprintf('qam%d_%dbest.mat', M, K);
    save(filename, 'Kbest_list');
end
```

---

Figure 6:
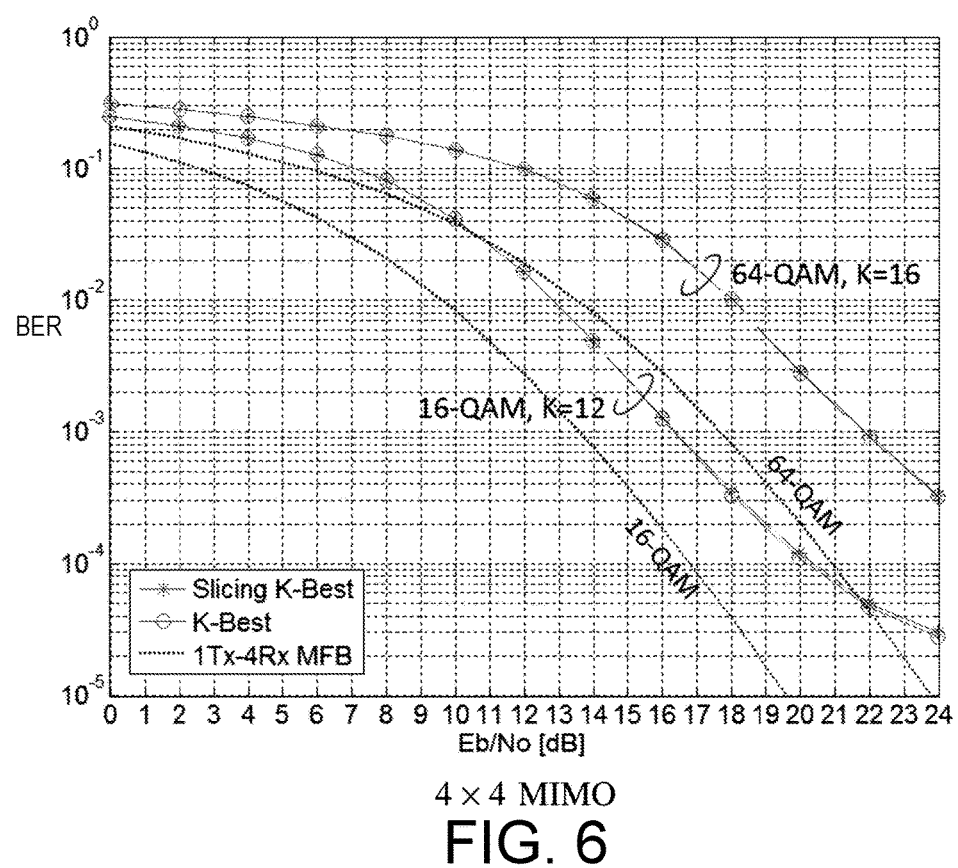
FIG. 6 is a graph comparing bit error rate versus $E_b/N_0$ in simulations of MIMO detectors for uncoded systems, including one representative 4×4 MIMO embodiment of the present invention.
Figure 7:
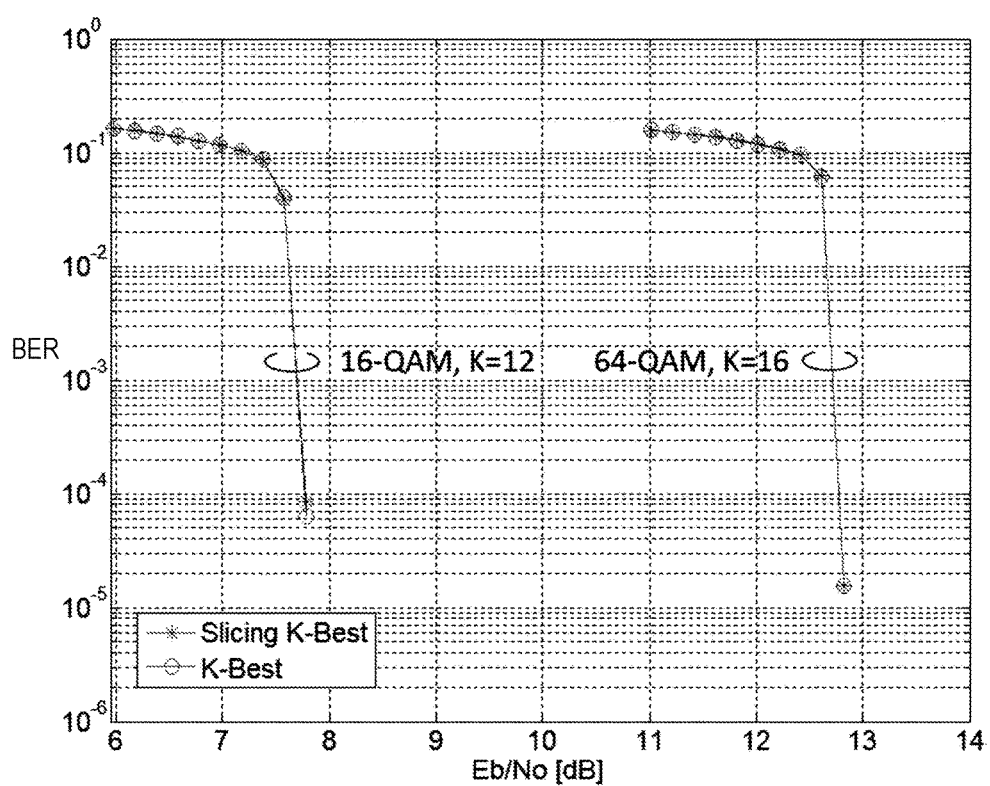
FIG. 7 is a graph comparing bit error rate versus $E_b/N_0$ in simulations of MIMO detectors for coded systems, including one representative 8×8 MIMO embodiment of the present invention.

As shown in FIGS. 6 and 7, a simulation results for the performance and complexity of several MIMO detection schemes, including the conventional K-best scheme and the slicing K-best scheme of the present invention. The uncoded BER versus $E_b/N_0$, or SNR per bit of the K-best detector and the slicing K-best detector for 16-QAM with K=12 and 64-QAM and K=16 are shown. Before the QR decomposition, the columns of the channel matrix H are permuted based on the decreasing order of signal-to-interference-plus-noise ratio (SINR). It can be seen that the BER curve for the slicing K-best detector is nearly indistinguishable from the BER curve for a conventional K-best detector.

The black dashed curves indicate the theoretical BER curves of the matched-filter bound (MFB) based on a single-input multiple-output (SIMO) channel. Comparing the BER curves of K-best and slicing K-best schemes to the MFB suggests that both schemes achieve almost full receiver diversity gain up to a certain SNR, even with K<M. This indicates that the slicing K-best schemes can be a good match for a coded system, as it performs relatively well with low complexity at lower SNR. At higher SNR, the diversity gain gets lower for both schemes.

For the sake of simplicity, the embodiment disclosed above restricts the elements of the transmit vector in a one-to-one fashion to the transmit antennas: the first vector element is the symbol transmitted from the first antenna, the second element is the symbol transmitted from the second antenna, etc. However, the invention can apply to a broader class of problems. In one alternate embodiment, N_s<=N symbols can be sent from N transmit antennas, without restricting each symbol to be sent from each antenna. For example, one embodiment might send three symbols from four transmit antennas as follows: construct a 3-by-1 vector of info symbols, hit it by a 4-by-3 "precoding" or "beamforming" matrix to produce a 4-by-1 vector, and then transmit each element of this 4-by-1 vector from each of 4 transmit antennas. Changing the transmitter in this way does not change the receiver problem. The above-disclosed solution would apply equally well to a situation like this.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of detecting a MIMO signal transmitted from N antennas, the MIMO signal representing a transmitted vector of N elements, each of the N elements being transmitted by a different one of the N antennas and each of the N elements including a selected symbol from an alphabet of M symbols, the MIMO signal represented as a received vector of $N_R$ elements, in which each of the $N_R$ elements corresponds to a different receiver antenna of an array of receiver antennas, the method comprising the steps of:
   (a) defining a finite number of decision regions within a complex plane, each decision region defined to encompass a different combination of K symbols in the alphabet, in which each decision region is bounded by threshold lines consisting of horizontal threshold lines that are parallel to the real axis and vertical threshold lines that are parallel to the imaginary axis, and in which K is a selected number taken from a set of integers;
   (b) modifying the received vector to be represented as a complex point p having a real component and an imaginary component;
   (c) nulling a reconstructed transmitted vector and then performing a loop of steps including:
      (i) mapping the complex point p onto the complex plane;
      (ii) then comparing the real component of the complex point p to the vertical threshold lines and imaginary component of complex point p to the horizontal threshold lines to determine which decision region encompasses the complex point p;
      (iii) then accessing a lookup table, in which the lookup table has been compiled offline, to determine which K symbols associated with the decision region that encompasses the complex point p are closest to the complex point p and adding the closest K symbols to a candidate set of detected symbol vectors;
      (iv) then subtracting the detected symbol from the complex decision point and returning to the mapping step; and
      (v) then when N detected symbols have been detected in the reconstructed transmitted vector, exiting the loop; and
   (d) after exiting the loop, returning the reconstructed transmitted vector.

2. The method of claim 1, further comprising the steps of:
   (a) choosing the horizontal threshold lines so that each of the horizontal threshold lines intersects the imaginary axis at integers ranging from $-\sqrt{M}$ to $\sqrt{M}$, and
   (b) choosing the vertical threshold lines so that each of the vertical threshold lines intersects the real axis at integers ranging from $-\sqrt{M}$ to $\sqrt{M}$.

3. The method of claim 2, employed in quadrature modulated (QAM) communications employing the alphabet of M symbols in which each symbol includes a real component and an imaginary component in which the real components and imaginary components consist of odd integers from $-\sqrt{M}+1$ to $\sqrt{M}-1$, wherein the step of defining a finite number of decision regions comprises the step of dividing the complex plane into a total of $4(\sqrt{M}+1)^2$ sub-regions, in which 4M of the sub-regions are defined to be square in shape are grouped together in a center portion of the complex plane, while $4(1+2\sqrt{M})$ of the sub-regions are placed at edges and the corners of the center portion and are of a semi-infinite rectangular in shape.

4. The method of claim 1, further comprising the step of selecting boundaries for each selected decision region so that each of the K symbols associated with the selected decision region is one of K best selections for a complex point p mapped into the selected decision region.

5. The method of claim 4, where compilation of the lookup table comprises the steps of:
   (a) associating each decision region with a list $\mathcal{L}_i$ associated with an i-th sub-region $\mathcal{R}$i; and
   (b) choosing the i-th sub-region $\mathcal{R}$i so as to minimize a following mean-squared-error (MSE) metric of the difference in Euclidean distances as follows:

$$\mathcal{L}_i = \arg\min_{\mathcal{L}} E\left[\frac{1}{K}\sum_{k=1}^{K}\{\hat{d}_k(p) - d_k(p)\}^2 \,\bigg|\, p \in \mathcal{R}_i\right], i = 1, \cdots, 4(\sqrt{M}+1)^2,$$

wherein $\hat{d}_1(p) \leq \hat{d}_1(p) \leq \ldots \leq d_k(p)$ are the sorted distances from a point $p \in C$ to each of the K symbols in a list $\mathcal{L}$, and $d_1(p) \leq d_2(p) \leq \ldots \leq d_{\bar{K}}(p)$ are the sorted distances from the point p to each of the closest K symbols in the minimum-distance list, in which the point p is a complex random variable that is defined by $p=x+n$, where $x \in \mathcal{A}$ ($\mathcal{A}$ including all symbols in the alphabet) is a uniformly distributed complex symbol, and n is zero-mean circularly-symmetric complex Gaussian noise.

6. The method of claim 1, wherein the step of subtracting the detected symbol from the complex point p comprises the steps of:
   (a) choosing $x \in A^N$ to minimize $$J_N(x) = \|y - Hx\|^2$$
$$= \|\hat{y} - Rx\|^2 = \sum_{l=1}^{N} |\hat{y}_l - \sum_{j=1}^{l} R_{lj} x_j|^2,$$

in which $\hat{y}=Q^H y$, where Q is a unitary matrix in the QR decomposition H=QR of a channel matrix, and where R is a lower-triangular matrix with positive real diagonal elements;

(b) interpreting $J_N(x)$ as being a sum of N branch metrics in a path through an M-ary tree with N layers, whose $M^N$ leaf nodes represent all possibilities for $x \in \mathcal{A}^N$, so that each $\mathcal{l}$-th layer of the tree has $M^{\mathcal{l}}$ nodes, one for each possible combination of $\{x_1, \ldots, x_l\}$;

(c) assigning to a branch from a node at an $(\mathcal{l}-1)$-th layer to a child at the $\mathcal{l}$-th layer a metric that is rewritten as: $BM_l = \tilde{y}_l - R_{ll}x_l^2$, where $$\tilde{y}_l = \hat{y}_l - \sum_{j=1}^{l-1} R_{lj} x_j$$

represents an observation for the $\mathcal{l}$-th layer after contributions from previous layer symbols $\{x_1, \ldots, x_{l-1}\}$ have been subtracted.

7. A signal processing circuit that is programmed to execute the method recited in claim 1.

8. A detecting method for detecting a MIMO signal transmitted from N antennas, the MIMO signal representing a transmitted vector of N elements, each of the N elements being transmitted by a different one of the N antennas and each of the N elements including a selected symbol from an alphabet of M symbols, the MIMO signal represented as a received vector of $N_R$ elements, in which each of the $N_R$ elements corresponds to a different receiver antenna of an array of receiver antennas, the method comprising the steps of:

(a) defining a finite number of decision regions within a complex plane, each decision region defined to encompass a different combination of K symbols in the alphabet, in which each decision region is bounded by threshold lines consisting of horizontal threshold lines that are parallel to the real axis and vertical threshold lines that are parallel to the imaginary axis, and in which K is a selected number taken from a set of integers, wherein the horizontal threshold lines are chosen so that each of the horizontal threshold lines intersects the imaginary axis at integers ranging from $-\sqrt{M}$ to $\sqrt{M}$ and wherein the vertical threshold lines are chosen so that each of the vertical threshold lines intersects the real axis at integers ranging from $-\sqrt{M}$ to $\sqrt{M}$;

(b) wherein each symbol includes a real component and an imaginary component in which the real components and imaginary components consist of odd integers from $-\sqrt{M}+1$ to $\sqrt{M}-1$, wherein the step of defining a finite number of decision regions comprises the steps of dividing a complex plane into a total of $4(\sqrt{M}+1)^2$ sub-regions, in which 4M of the sub-regions are defined to be square in shape are grouped together in a center portion of the complex plane, while $4(1+2\sqrt{M})$ of the sub-regions are placed at edges and the corners of the center portion and are of a semi-infinite rectangular in shape and selecting boundaries for each selected decision region so that each of the K symbols associated with the selected decision region is one of K best selections for a complex point p mapped into the selected decision region;

(c) modifying the received vector to be represented as a complex point p having a real component and an imaginary component;

(d) nulling a reconstructed transmitted vector and then performing a loop of steps including:
  (i) mapping the complex point p onto the complex plane;
  (ii) then comparing the real component of the complex point p to the vertical threshold lines and imaginary component of complex point p to the horizontal threshold lines to determine which decision region encompasses the complex point p;
  (iii) then accessing a lookup table, in which the lookup table has been compiled offline, to determine which K symbols associated with the decision region that encompasses the complex point p are closest to the complex point p and adding the closest K symbols to the reconstructed transmitted vector;
  (iv) then subtracting the detected symbol from the complex decision point and returning to the mapping step; and
  (v) then when N detected symbols have been detected in the reconstructed transmitted vector, exiting the loop; and (e) after exiting the loop, returning the reconstructed transmitted vector.

9. The detecting method of claim 8, wherein compilation of the lookup table comprises the steps of:

(a) associating each decision region with a list $\mathcal{L}_i$ associated with an i-th sub-region $\mathcal{R}_i$; and (b) choosing the i-th sub-region $\mathcal{R}_i$ so as to minimize a following mean-squared-error (MSE) metric of the difference in Euclidean distances as follows:

$$\mathcal{L}_i = \arg \min_{\mathcal{L}} E\left[ \frac{1}{K} \sum_{k=1}^{K} \{\hat{d}_k(p) - d_k(p)\}^2 \bigg| p \in \mathcal{R}_i \right], i = 1, \cdots, 4(\sqrt{M}+1)^2,$$

wherein $\hat{d}_1(p) \leq \hat{d}_2(p) \leq \ldots \leq \hat{d}_K(p)$ are the sorted distances from a point $p \in \mathbb{C}$ to each of the K symbols in a list $\mathcal{L}$, and $d_1(p) \leq d_2(p) \leq \ldots \leq d_K(p)$ are the sorted distances from the point p to each of the closest K symbols in the minimum-distance list, in which the point p is a complex random variable that is defined by $p=x+n$, where $x \in \mathcal{A}$ ($\mathcal{A}$ including all symbols in the alphabet) is a uniformly distributed complex symbol, and n is zero-mean circularly-symmetric complex Gaussian noise.

10. The detecting method of claim 8, wherein the step of subtracting the detected symbol from the complex point p comprises the steps of:

(a) choosing $x \in A^N$ to minimize $$J_N(x) = \|y - Hx\|^2$$
$$= \|\hat{y} - Rx\|^2 = \sum_{l=1}^{N} |\hat{y}_l - \sum_{j=1}^{l} R_{lj} x_j|^2,$$

in which $\hat{y}=Q^H y$, where Q is a unitary matrix in the QR decomposition H=QR of a channel matrix, and where R is a lower-triangular matrix with positive real diagonal elements;

(b) interpreting $J_N(x)$ as being a sum of N branch metrics in a path through an M-ary tree with N layers, whose $M^N$ leaf nodes represent all possibilities for $x \in \mathcal{A}^N$, so that each $\mathscr{l}$-th layer of the tree has $M^{\mathscr{l}}$ nodes, one for each possible combination of $\{x_1, \ldots, x_{\mathscr{l}}\}$;

(c) assigning to a branch from a node at an $(\mathscr{l}-1)$-th layer to a child at the $\mathscr{l}$-th layer a metric that is rewritten as: $BM_{\mathscr{l}} = |\tilde{y}_{\mathscr{l}} - R_{\mathscr{l}\mathscr{l}} x_{\mathscr{l}}|^2$, where $$\tilde{y}_l = \hat{y}_l - \sum_{j=1}^{l-1} R_{lj} x_j$$

represents an observation for the $\mathscr{l}$-th layer after contributions from previous layer symbols $\{x_1, \ldots, x_{\mathscr{l}-1}\}$ have been subtracted.

11. A signal processing circuit that is programmed to execute the method recited in claim 8.

12. A receiver for receiving a MIMO signal transmitted from N antennas, the MIMO signal representing a transmitted vector of N elements, each of the N elements being transmitted by a different one of the N antennas and each of the N elements including a selected symbol from an alphabet of M symbols, the MIMO signal represented as a received vector of $N_R$ elements, in which each of the $N_R$ elements corresponds to a different receiver antenna of an array of receiver antennas, the receiver comprising:
(a) an array of $N_R$ antennas;
(b) a memory on which is stored a lookup table that has been compiled offline and that relates values of the received vector to symbols from the alphabet;
(c) a signal processing circuit, responsive to the antennas and in data communication with the memory, that is programmed to execute steps, including:
  (i) define a finite number of decision regions within a complex plane, each decision region defined to encompass a different combination of K symbols in the alphabet, in which each decision region is bounded by threshold lines consisting of horizontal threshold lines that are parallel to the real axis and vertical threshold lines that are parallel to the imaginary axis, and in which K is a selected number taken from a set of integers;
  (ii) modify the received vector to be represented as a complex point p having a real component and an imaginary component;
  (iii) null a reconstructed transmitted vector and then execute a loop of steps including:
    (1) map the complex point p onto the complex plane;
    (2) then compare the real component of the complex point p to the vertical threshold lines and imaginary component of complex point p to the horizontal threshold lines to determine which decision region encompasses the complex point p;
    (3) then access the lookup table to determine which K symbols associated with the decision region that encompasses the complex point p are closest to the complex point p and adding the closest one of the K symbols to the reconstructed symbol vector;
    (4) then subtract the detected symbol from the complex decision point and returning to the mapping step; and
    (5) then when N detected symbols have been detected in the reconstructed transmitted vector, exit the loop; and
  (iv) after exiting the loop, return the reconstructed transmitted vector.

13. The receiver of claim 12, wherein the signal processing circuit is further programmed to execute steps including:
(a) choose the horizontal threshold lines so that each of the horizontal threshold lines intersects the imaginary axis at integers ranging from $-\sqrt{M}$ to $\sqrt{M}$; and
(b) choose the vertical threshold lines so that each of the vertical threshold lines intersects the real axis at integers ranging from $-\sqrt{M}$ to $\sqrt{M}$.

14. The receiver of claim 13, employing quadrature modulated (QAM) communications employing the alphabet of M symbols in which each symbol includes a real component and an imaginary component in which the real components and imaginary components consist of odd integers from $-\sqrt{M}+1$ to $\sqrt{M}-1$, wherein the finite number of decision regions are defined by dividing the complex plane into a total of $4(\sqrt{M}+1)^2$ sub-regions, in which 4M of the sub-regions are defined to be square in shape are grouped together in a center portion of the complex plane, while $4(1+2\sqrt{M})$ of the sub-regions are placed at edges and the corners of the center portion and are of a semi-infinite rectangular in shape.

15. The receiver of claim 12, wherein the signal processing circuit is further programmed to select boundaries for each selected decision region so that each of the K symbols associated with the selected decision region is one of K best selections for a complex point p mapped into the selected decision region.

16. The receiver of claim 15, wherein the signal processing circuit is further programmed to:
(a) associate each decision region with a list $\mathcal{L}_i$ associated with an i-th sub-region $\mathcal{R}_i$; and
(b) choose the i-th sub-region $\mathcal{R}_i$ so as to minimize a following mean-squared-error (MSE) metric of the difference in Euclidean distances as follows:

$$\mathcal{L}_i = \arg \min_{\mathcal{L}} E\left[\frac{1}{K}\sum_{k=1}^{K}\{\hat{d}_k(p) - d_k(p)\}^2 \,\bigg|\, p \in \mathcal{R}_i\right], i = 1, \cdots, 4(\sqrt{M}+1)^2,$$

wherein $\hat{d}_1(p) \leq \hat{d}_1(p) \leq \ldots \leq \hat{d}_K(p)$ are the sorted distances from a point $p \in C$ to each of the K symbols in a list $\mathcal{L}$, and $d_1(p) \leq d_2(p) \leq \ldots \leq d_K(p)$ are the sorted distances from the point p to each of the closest K symbols in the minimum-distance list, in which the point p is a complex random variable that is defined by $p = x + n$, where $x \in \mathcal{A}$ ($\mathcal{A}$ including all symbols in the alphabet) is a uniformly distributed complex symbol, and n is zero-mean circularly-symmetric complex Gaussian noise.

17. The receiver of claim 12, wherein the signal processing circuit subtracts the detected symbol from the complex point p by executing the steps of:
(a) choose $x \in A^N$ to minimize $$J_N(x) = \|y - Hx\|^2$$
$$= \|\hat{y} - Rx\|^2 = \sum_{l=1}^{N} |\hat{y}_l - \sum_{j=1}^{l} R_{lj} x_j|^2,$$

in which $\hat{y} = Q^H y$, where Q is a unitary matrix in the QR decomposition $H = QR$ of a channel matrix, and where R is a lower-triangular matrix with positive real diagonal elements;

(b) interpret $J_N(x)$ as being a sum of N branch metrics in a path through an M-ary tree with N layers, whose $M^N$ leaf nodes represent all possibilities for $x \in \mathcal{A}^N$, so that each $\mathcal{l}$-th layer of the tree has $M^{\mathcal{l}}$ nodes, one for each possible combination of $\{x_1, \ldots, x_{\mathcal{l}}\}$;

(c) assign to a branch from a node at an $(\mathcal{l}-1)$-th layer to a child at the $\mathcal{l}$-th layer a metric that is rewritten as: $BM_{\mathcal{l}} = |\tilde{y}_{\mathcal{l}} - R_{\mathcal{l}\mathcal{l}} x_{\mathcal{l}}|^2$ where $$\tilde{y}_l = \hat{y}_l - \sum_{j=1}^{l-1} R_{lj} x_j$$

represents an observation for the $\mathcal{l}$-th layer after contributions from previous layer symbols $\{x_1, \ldots, x_{\mathcal{l}-1}\}$ have been subtracted.

18. The receiver of claim 12, disposed in a cellular telephone.

* * * * *